F. J. Plummer,
Wood Plane Attachment.
Nº 59,514.  Patented Nov. 6, 1866.
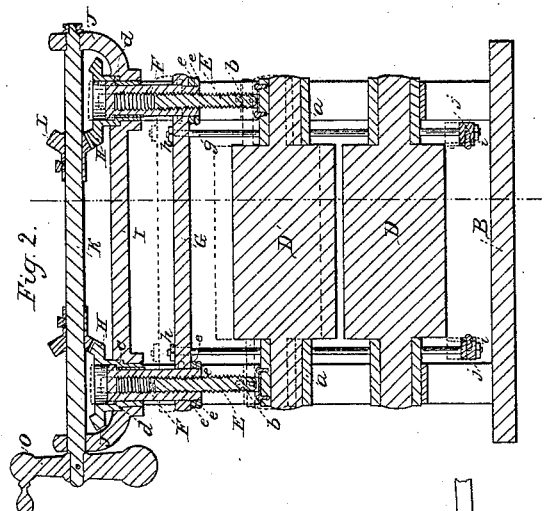
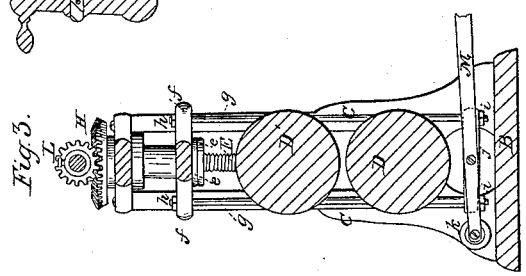
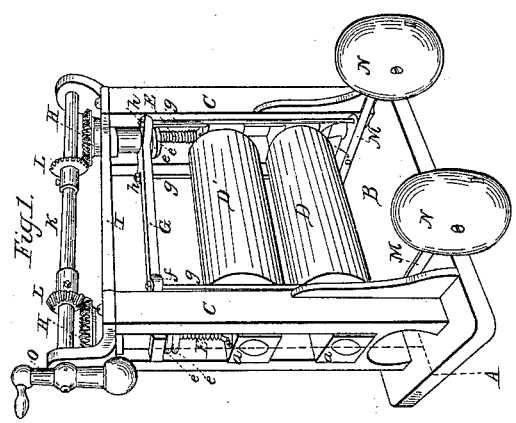
Witnesses.
Thos. H. Dodge
D. L. Miller
Inventor:
Frank J. Plummer

UNITED STATES PATENT OFFICE.

FRANK J. PLUMMER, OF WORCESTER, MASSACHUSETTS, ASSIGNOR TO R. BALL & CO., OF SAME PLACE.

IMPROVEMENT IN FEED-ROLLERS FOR PLANING-MACHINES.

Specification forming part of Letters Patent No. 59,514, dated November 6, 1866.

*To all whom it may concern:*

Be it known that I, FRANK J. PLUMMER, of the city and county of Worcester, and Commonwealth of Massachusetts, have invented certain new and useful Improvements in Machines for Working Wood; and I do hereby declare the following is a full, clear, and exact description of the same, reference being had to the accompanying drawings, forming a part of this specification, in which—

Figure 1 represents a perspective view of the feed-rolls and the frame which supports them, with my improvements applied thereto, of a machine for planing boards and other similar purposes. Fig. 2 represents a longitudinal central section on line marked A, Fig. 1. Fig. 3 represents a section showing the mode of hanging the weights.

My improvements relate to the peculiar mode of adjusting and operating the top feed-roll in connection with the weights, as will be hereinafter described.

In the drawings, B represents the base which supports the uprights C C, in which are supported the bearings $a\ a\ a\ a$ of the feed-rolls D D'.

The bearings or boxes of the upper feed-roll are connected to the lower ends of rods E E by means of hinged joints $b\ b$, as fully indicated in the drawings.

The upper ends of the screw-rods E E work or screw into the cylinders F F, which pass up through the cross-piece G and hubs of gears H H, as shown in the drawings.

The hubs of gears H H have shoulders $c\ c$, which rest upon corresponding projections $d\ d$ in top frame-piece I, in the curved ends J J of which is supported the horizontal shaft K, upon which are the bevel-gears L L, which operate the gears H H, and through them the cylinders F F and screw-rods E E.

Upon the lower ends of cylinders F F are cut screw-threads to receive the duplicate nuts $e\ e$, upon the top of which rests the cross-piece G.

There are two projections, $f\ f$, at each end of the cross-piece G, which answer a twofold purpose. They operate as guides to the piece G, to keep it in proper position, and also as supports to the weight-rods $g\ g$, which pass through them and have heads or nuts $h$ on their upper ends.

The lower ends of weight-rods $g\ g$ are also provided with heads or nuts $i$, upon which rest yokes $j$, as indicated in the drawings.

The short end of a lever, M, is hinged to a projection, $k$, upon the inside of each upright piece C, and is also fulcrumed to the center of its respective yoke $j$. The long ends of levers M extend through under the bottom roll, and are provided with weights N N, as fully shown in the drawings.

It will be seen from the above description and by reference to the drawings that the weights N are supported by the rods $g\ g$, which are suspended from the cross-piece G, which rests upon the nuts $e\ e$ upon the cylinders F, so that the upper feed-roll, D', cannot rise when in use without lifting the weights N N, since the cylinders F are supported by the screw-rods E, which rest upon boxes or bearings of the feed-rolls D', as fully shown in red lines in Fig. 2 of the drawings.

As the screw-rods E are hinged at their lower ends, and as the cylinders F are fitted so as to work loosely in the hubs of gears H, either end of the feed-roll D' can rise or fall independently of the other end of the roll sufficiently to enable the roll to conform to any inequality in the thickness of boards. The upper part of the interior of cylinder F may be cored out, so as to obviate the necessity of cutting a screw-thread for rods E therein except at the bottom of the cylinders. Cylinders F are provided with splines $n$, to work up and down in corresponding grooves in the hubs of gears H, whereby the cylinders are always revolved when gears H are.

The operator, by means of crank O, turns shaft K, thereby giving motion to gears L and H and cylinders F, thereby either raising or lowering the screw-rods E E, together with the feed-roll D', to the bearings of which the screw-rods E E are hinged. The double nuts $e\ e$ are used upon the bottom ends of cylinders F, to prevent their being displaced when the cylinders F are turned in the operation of adjusting the feed-roll D'.

It will be seen that, in raising or lowering the feed-roll D' to adjust it to feed thick or thin boards by means of shaft K, the weights are not affected at all, since the cross-piece G is not raised. This is quite an important matter, since the pressure is the same upon the material in either case. No adjustment of the weights is therefore necessary when changing from thick to thin material.

To relieve and obviate the friction between nuts e and the cross-piece G, when the cylinders F are turned to raise or lower the screw-rods E and feed-rolls D, adjustable supports may be attached to the side piece C to support the rods M and weights N when the machine is not in operation.

I have described my invention as applied in connection with the top feed-roll of a machine for planing boards, so much of the machine only being shown as is necessary to illustrate my invention.

The feed-table, cutters, and other parts not shown may be made similar to those in common use.

I do not claim, broadly, adjusting the feed-roll to boards of different dimensions or thicknesses without affecting the lever-weights; nor do I claim, broadly, giving a vertical movement to the feed-roll independent of that received from the gear mechanism, for I am aware that the same results have been effected before by other and prior inventors to myself; but what I do claim as my invention is the special arrangement of mechanisms for attaining these results, especially the arrangement and construction of the internal screw-cylinders, which are not only combined with the lever-weights, gear mechanism, and feed-roll, but also allow the vertical movement above alluded to of the feed-roll, and, in fact, constitute the means by which the feed-roll is connected with the other parts of the machine.

Having described my improvements in the feed of machines for planing boards and for similar purposes,

What I claim therein as new and of my invention, and desire to secure by Letters Patent, is—

1. Adjusting the top feed-roll of a planing-machine by means of screw-rods, respectively hinged to the journal-boxes of such roll and working in internal screw-cylinders so attached to the gear-wheels as that while revolving with the gear-wheels they shall have a sliding or vertical motion independent therefrom, substantially as described and for the purposes set forth.

2. The combination, with the internal screw-cylinders attached to the gear-wheels, as described, and receiving the screw-rods hinged to the feed-roll, of the lever-weights, substantially as and for the purposes set forth.

FRANK J. PLUMMER.

Witnesses:
THOS. H. DODGE,
D. L. MILLER.